United States Patent [19]

Yanagiuchi et al.

[11] 4,373,192
[45] Feb. 8, 1983

[54] DISPLAY DEVICE OF AN ELECTRONIC LANGUAGE INTERPRETER

[75] Inventors: Shigenobu Yanagiuchi, Tenri; Ikuo Kanou, Yamatokoriyama, both of Japan

[73] Assignee: Sharp Kabushiki Kaisha, Osaka, Japan

[21] Appl. No.: 180,871

[22] Filed: Aug. 25, 1980

[30] Foreign Application Priority Data

Aug. 27, 1979 [JP] Japan .............................. 54-109572
Aug. 29, 1979 [JP] Japan .............................. 54-110800

[51] Int. Cl.³ ...................... G06G 15/38; G08B 5/22
[52] U.S. Cl. .................................. 364/900; 364/419; 364/710; 340/792
[58] Field of Search ... 364/900 MS File, 200 MS File, 364/419, 709, 710, 518; 434/156; 340/792

[56] References Cited

U.S. PATENT DOCUMENTS

| | | | |
|---|---|---|---|
| 3,493,956 | 2/1970 | Andrews | 340/792 |
| 3,932,854 | 1/1976 | Kyriakides | 340/756 |
| 3,976,995 | 8/1976 | Sebestyen | 340/792 |
| 4,158,236 | 6/1979 | Levy | 434/156 |
| 4,218,760 | 8/1980 | Levy | 364/900 |
| 4,298,865 | 11/1981 | Masuzawa | 340/792 |

FOREIGN PATENT DOCUMENTS 1448211 9/1976 United Kingdom ............... 364/900

Primary Examiner—Charles E. Atkinson
Assistant Examiner—Michael R. Fleming
Attorney, Agent, or Firm—Birch, Stewart, Kolasch and Birch

[57] ABSTRACT

An electronic language interpreter is characterized by having a display device for displaying second words represented in a second language equivalent to a first word in a first language. When the data length of the second words exceeds the capacity of digits contained within the display device, the second words are displayed with shifting or running of the overall data on the display device. Separating means are associated with the display device for separating the second words in response to the presence of a particular mark such as a comma, a part of speech etc. The particular mark is allotted in a certain portion between the second words.

8 Claims, 15 Drawing Figures

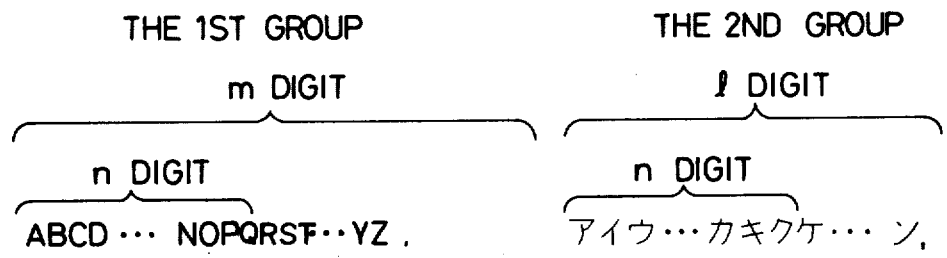
FIG. 2
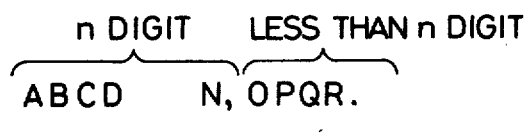
FIG. 3
FIG. 4
(1) | A  B  C  D  ···  N  , |
(2) | O  P  Q  R  . |
FIG. 5
n DIGIT
A B C D ··· M , N O P Q R , S T U ··· X Y Z ,
FIG. 6

(1) | A B C D ··· M , N |

(2) | B C D ··· M , N O |

(3) | ··· M , N O P Q R , |

(4) | S T U ··· X Y |

(5) | T U ··· X Y Z |

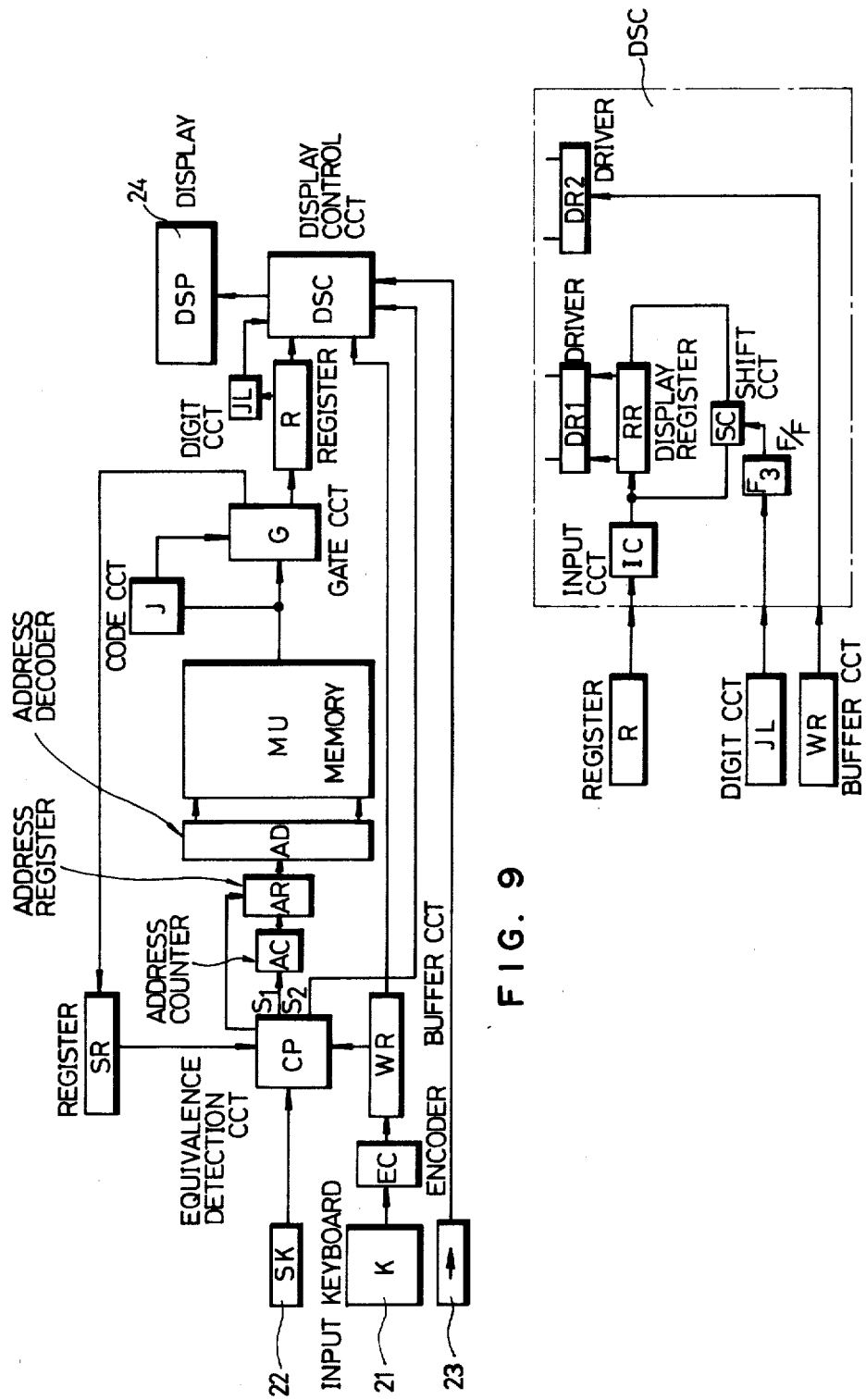

(a) 
| fly |
| vi . トブ , カゼ ニナビ ク , |

(b)
| fly |
| i . トブ , カゼ ニナビ ク , ニ |

⋮

(c)
| fly |
| ブ , カゼ ニナビ ク , ニゲ ル |

(d)
| fly |
| vt . トバス |

(e)
| fly |
| n . トブ コト |

(f)
| fly |
| vi . トブ , カゼ ニナビ ク , |

FIG. 15

DISPLAY DEVICE OF AN ELECTRONIC LANGUAGE INTERPRETER

BACKGROUND OF THE INVENTION

The present invention relates in general to an electronic dictionary and language interpreter for providing efficient and rapid retrieval of any desired word stored therein, and more particularly, to a new and effective type of display device for displaying a plurality of words developed from such an electronic dictionary and language interpreter.

Recently, a new type of electronic device called an electronic dictionary and language interpreter has been available on the market. The electronic dictionary and language interpreter differ from any conventional types electronic devices in that the former is of a unique structure which provides for efficient and rapid retrieval of word information stored in a memory. An example of an electronic dictionary and language interpreter was disclosed in Levy U.S. Pat. No. 4,158,236, June 12, 1979, "ELECTRONIC DICTIONARY AND LANGUAGE INTERPRETER".

Although not directed to such an electronic language interpreter device but directed to a conventional electronic apparatus such as an electronic calculator, there have been presented various types of systems for displaying data derived from the electronic apparatus, the length of which is more than the capacity of a display panel in the electronic apparatus. One of them has been a system for advance splitting of the data to be displayed into two or more groups. There have been inherent problems, however, in that the connection between the groups has been indefinite and vague, leading to operator error in recognizing the overall or combined contents being displayed.

Another has been a system for sequentially shifting and running the contents in the display panel one after another or digit by digit. An example of such a system is disclosed in a copending U.S. patent application Ser. No. 058,666 filed on July 18, 1979 by S. Masuzawa et al., assigned to the present assignee, entitled "A DISPLAY DEVICE FOR ELECTRONIC CALCULATORS OR THE LIKE". The disclosure of U.S. patent application Ser. No. 058,666 is incorporated herein by reference.

There have been inherent problems, however, that images being displayed flicker change and flow, with the result that the images displayed have been difficult to read.

It is desirable that the display device make the contents being displayed easily recognized and readable and that the display device form a clear connection between portions of the contents being displayed in a manner suitable for an electronic translator device.

Even in the case where the length of the data to be displayed is not more than the capacity of the display panel, it may be preferable that the data being displayed be separated with a classification symbol if such a classification is available and useful for assisting the recognition of the data displayed.

SUMMARY OF THE INVENTION

Accordingly, it is an object of the present invention to provide an improved display device suitable for an electronic interpreter apparatus.

It is another object of the present invention to provide an improved display device of the type which runs and shifts data displayed by an electronic interpreter apparatus.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an electronic language interpreter is characterized by having a display device for displaying second words represented in a second language equivalent to a first word written in a first language, such that in the case where the length of the second words exceeds the capacity of the display device, the second words are displayed with shifting or running the overall data on the display device.

A separating device is connected to the display device for separating the second words according to the presence of a particular mark such as a comma, a part of speech etc. The particular mark is allotted in a certain portion between the second words.

BRIEF DESCRIPTION OF THE DRAWINGS

The present invention will become fully understood from the detailed description given hereinbelow and the accompanying drawings which are given by way of illustration only, and thus are not limitative of the present invention and wherein:

FIG. 2 shows two groups of characters which are displayed in a display of the control circuit of FIG. 1;

FIG. 3 shows steps of displaying the two groups of characters as shown in FIG. 2 in the display;

FIG. 4 shows another group of characters which are also displayed in the display of the control circuit of FIG. 1;

FIG. 5 shows steps of displaying the group of characters as shown in FIG. 4 in the display;

FIG. 6 shows a group of characters which are further displayed in the display of the control circuit of FIG. 1;

FIG. 9 represents a circuit diagram of a control circuit implemented within the electronic language interpreter shown in FIG. 8;

FIG. 10 shows a more detailed current diagram of a display circuit contained within the control circuit of FIG. 9;

FIG. 15 indicates steps of displaying data generated by the control circuit as shown in FIG. 9 in the display.

DESCRIPTION OF THE INVENTION

Figure 1:
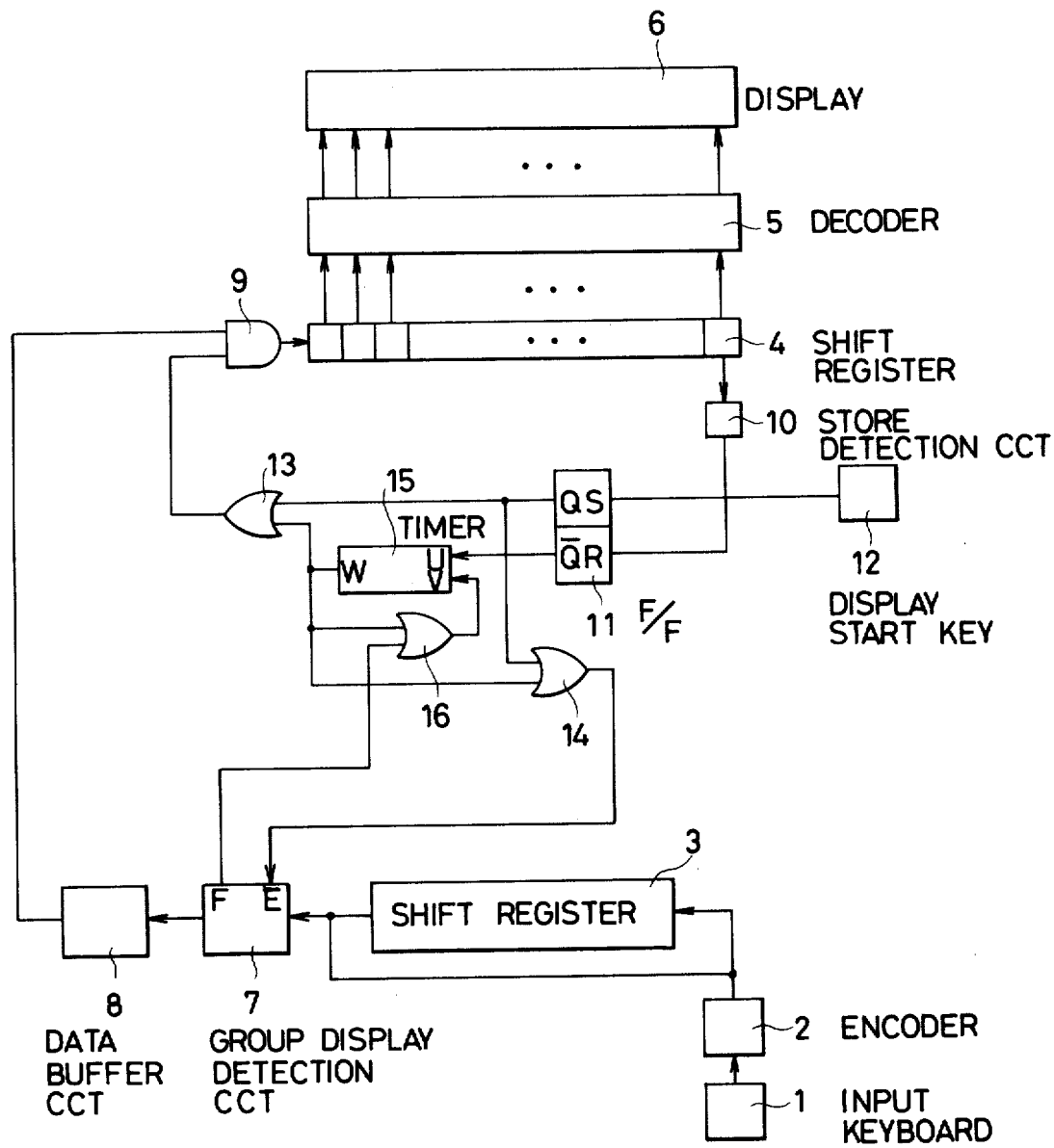
FIG. 1 shows a circuit diagram of a control circuit of an electronic language interpreter according to the present invention.

Referring now to FIG. 1, there is illustrated a control circuit comprising an input keyboard 1, an encoder 2, two shift registers 3 and 4, a decoder 5, a display 6, a group display detection circuit 7, a data buffer circuit 8, an AND gate 9, a store detection circuit 10, a flip flop 11, a display start key 12, three OR gates 13, 14 and 16, and a timer 15.

A desired chain of letters is applied to the input keyboard 1 and encoded by the encoder 2 so that the resultant signals are stored in the shift register 3. The signals stored in the shift register 3 are transferred to the shift register 4 as described hereinbelow. The signals stored in the shift register 4 are decoded by the decoder 5 so that the letters are indicated in the display 6.

FIG. 2 shows two groups of letter or characters which are to be indicated in the display 6. The first group of letters consists of 26 capital letters in alphabetical order while the second group of letters consists of 51 Japanese Katakana letters aligned in the Japanese alphabetical order. There is provided a means for indicating separation between the first and the second groups of letters. A preferable indicating means may be a comma ",".

It is assumed that the display 6 has display capacity of n digits (n>1) and each of the first group and the second group of letters has m digits and m is greater than n. It is usual that each of the first group and the second group of letters may be a specific word or a specific sentence written in a desired language. The input keyboard 1 contains a plurality of key switches, preferably, alphabetical key switches each actuated for entering an item of a desirable group of letters. The indicating means, say, a comma ",", is also entered by the actuation of the input keyboard 1.

Alternatively, either or both of the first and the second groups of letters as shown in FIG. 2 may be obtained as output generated by an electronic device such as an electronic translator as described below. This modification can be applicable to the embodiments of FIGS. 4 and 6. In such a case, an appropriate change of the circuit of FIG. 1 should be made. Such change is within the knowledge of those skilled in the art as will be evident from the description hereinafter. In this preferred form of the present invention, it is supposed that both groups are entered by means of the input keyboard 1.

The first group and the second group of letters entered by the input keyboard 1 are applied to the shift register 3 through the encoder 2. The signals indicative of the first group and the second group of letters are developed by the shift register 3. The signals developed are transferred in the shift register 4 through the group display detection circuit 7, the data buffer circuit 8, and the AND gate 9. The shift register 4 consists of storage cells of n digits. The store detection circuit 10 is provided for detecting that appropriate signals are stored in the last storage cell of the shift register 4. In such a case, the store detection circuit 10 generates output signals to reset the flip flop 11.

The display start key 12 is provided for initiating operation of the display 6. In response to the actuation of the display start key 12, the flip flop 11 is turned set. Set output signals provided by the flip flop 11 are applied to the AND gate 9 through the OR gate 13. The set output signals are also applied to an input terminal E of the group display detection circuit 7 through the OR gate 14. Reset output signals generated by the flip flop 11 are applied to an input terminal U of the timer 15. Single-pulse signals or one-short pulse signals developed from an output terminal W of the timer 15 are introduced into the two OR gates 13 and 14, and entered to another input terminal V of the timer 15 through the OR gate 16. The OR gate 16 further receives output signals developed from an output terminal F of the group display detection circuit 7.

The set output pulse-like signals developed from the flip-flop 11 by the actuation of the display start key 12 are applied to the input terminal E of the group display detection circuit 7 through the OR gate 14. Hence, the circuit 7 is operated to enable the transference of the stored signals from the shift register 3 to the shift register 4. By the entrance of pulse signals into the input terminal E, the circuit 7 is operated to generate a single pulse from the output terminal F in the case of the following situations.

(a) The letter information of n digits is transferred from the shift register 3 to the shift register 4, wherein the n-th letter information represents the indicating means, the comma ",".

(b) Single-digit letter information is transferred from the shift register 3 to the shift register 4, wherein the single-digit letter information represents the indicating means, the comma ",".

When the next pulse signal is applied to the input terminal E following transfer of the indicating means, the comma ",", as noted above, is operated to enable the transference of the stored signals having n digits from the shift register 3 to the shift register 4 for the time when the pulse signals continue to generate.

The timer 15 is operated when the start input signals developed from the flip flop 11 are admitted to an input terminal U. The one-shot pulse signals are generated from the output terminal W of the timer 15 when a predetermined timer T has elapsed after the reset input signals to the input terminal U or otherwise after the pulse signals are applied to the input terminal V by means of the OR gate 16.

The first and the second groups of letters of FIG. 2 are indicated in the display 6 in a manner described with reference to FIG. 3. The input keyboard 1 is actuated to enter two groups of letter information, A to Z, ",", and the Japanese Katakana letters. Then the display start key 12 is actuated. The flip flop 11 is turned set so that the set output signals are applied to the AND gate 9. Thus the signals stored in the shift register 3 are transmitted to the shift register 4. When a signal is transmitted to the last storage cell of the shift register 4, the store detection circuit 10 allows the flip flop 11 to be made reset. In such a case, the n-digit letters are shown in the display 6 as shown in FIG. 3(1). This displaying condition is continuosly maintained for the predetermined time T after the reset output signals developed by the flip flop 11 are entered to the timer 15.

The output signals generated by the timer 15 are admitted to the AND gate 9 through the OR gate 13 and the group display detection circuit 7 through the OR gate 14. Then, single-digit letter information "O" stored in the shift register 3 is transported into the shift register 4 through the group display detection circuit 7, the data buffer circuit 8, and the AND gate 9. Thus the display changes to that shown in FIG. 3(2) wherein the letters being displayed in the display 6 are shifted to the left by one digit. The display of FIG. 3(2) continues for the predetermined time T before the timer 15 again supplies its output signal.

Similar procedures are repeated to change the displays to those shown in FIGS. 3(3) and 3(4) for the predetermined time T, respectively.

After the display of FIG. 3(4) continues during the predetermined time T, the timer 15 supplies its output signal to transfer the indicating means, the comma "," from the shift register 3 to the shift register 4. The group display detection circuit 7 detects this information so that it goes on providing the output pulses from the output terminal F during the period wherein the timer 15 continues to generate its output signals. This changes the display to that shown in FIG. 3(5) for the predetermined time T.

Thus, each time a new letter is added to the display, the letters indicated in the display 6 are shifted to the left digit by digit each time for predetermined time T controlled by the timer 15 until the last letter "Z" belonging to the first group of letters is displayed within the right portion of the display 6 as shown in FIGS. 3(4) and 3(5). The group display detection circuit 7 then functions to detect the occurrence of the indicating means, the comma "," on the display 6 as shown in FIG. 3(5).

After the display of FIG. 3(5) continues for the predetermined time T, in response to the indicating means, the comma "," being in the n-th position, as described above, the circuit 7 is responsive to the output pulse signals from the timer 15 for transferring the stored information relating to the following n digits from the shift register 3 to the shift register 4.

The first n-digit letters belonging to the second group of letters is then displayed as shown in FIG. 3(6) for the predetermined time T. Thereafter, the remaining letters belonging to the second group of letters are displayed as the display 6 is shifted to the left digit by digit for each predetermined time T as shown in FIG. 3(7).

FIG. 4 shows another type of letter combination. The first group has n-1 digits A through N and is followed by the indicating means, the comma ",". The second group has less than n digits covering O,P,Q,R and a period ".". When the first n signals stored in the shift register 3 are transferred to the shift register 4 in the same manner as described above, the group display detection circuit 7 detects the comma allotted in the last digit of the first n digits. Therefore, after the display indication in FIG. 5(1) continues for the predetermined time T, the signals representing the letters related to the second group of less than n digits are transported from the shift register 3 to the shift register 4. The dispaly of FIG. 5(2) is then shown.

FIG. 6 shows a further type of a group of letters containing the indicating means, the comma "," interposed among the first n letters to be displayed in the display 6. These n-digit letters are also introduced by means of the input keyboard 1 into the shift register 3. The display start key 12 is operated so that the flip-flop is turned set, in which case the signals stored in the shift register 3 are transported to the shift register 4, passing through the group display detection circuit 7. Thus the display of FIG. 7(1) is shown. The store detection circuit 10 does not detect the indicating means, the comma "," in the last position of register 4 since all the first n digits of A through N and the comma "," are introduced in the shift register 4 at once without shifting operation.

Figures 7, 8:
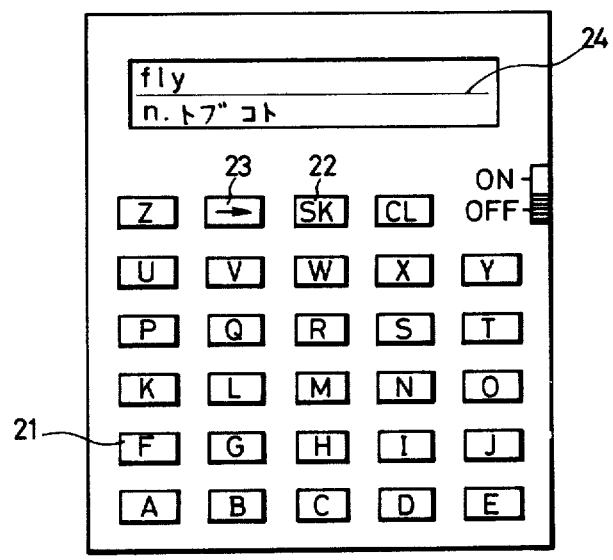
FIG. 7 shows steps of displaying the group of characters as shown in FIG. 6 in the display.
FIG. 8 shows a plan view of another embodiment of an electronic language interpreter according to the present invention.

As indicated in FIGS. 7(2) and 7(3), the display will therefore shift digit by digit for each the predetermined time T. When the comma "," is contained in the last position of the display 6, the following n digits, namely, "S,T,U ... X,Y" replace the previous n-digits letters as shown in FIG. 7(4). The display of FIG. 7(5) is then obtained by shifting the display of FIG. 7(4) by one digit the the left.

It will be apparent that the indicating means is not limited to the comma ",". An equivalent means such as a single-digit blank etc. is also available.

The above described display operation with shift control is carried out digit by digit wherein each display is maintained for the predetermined time T which is considerably longer than the time required for the shift of each digit. In another preferred form of the present invention, a running displaying system can be adapted wherein the data displayed sequentially flow and are shifted digit by digit as disclosed in the above referenced U.S. patent application Ser. No. 058,666. This running displaying system is useful for a dot matrix type display. Such running display system may be obtained by making the predetermined time T approximately equivalent to the time required for the shift of each digit.

Attention is directed to another preferred form of the present invention. Purposes of this preferred form of the present invention are as follows:

(1) In accordance with a first word entered by the operator, a translated word equivalent to the first word is obtained. If there are present two or more translated words equivalent to the first word, they are grouped by a certain reference, in particular, a part of speech to which one or more translated words belong. Being separated by the part of speech, the two or more translated words are outputted.

(2) When many translated words are equivalent to the first word, such translated words are displayed by the above described shifting display regardless of whether they continuously flow or not. In such a case, it may be preferable that an additional switch is provided for repeating the display of the many translated words to reread them.

Any kind of languages can be applied to the electronic translator of the present invention. An input "source" word is spelled in a specific language to obtain an equivalent word, or a translated word spelled in a different language corresponding thereto. According to an example of the present invention, it is assumed that the "source" language is English and the translated language is Japanese.

Referring now to FIG. 8, there is illustrated a plan view of the electronic interpreter according to another preferred form of the present invention. The electronic interpreter of FIG. 8 comprises 26 alphabetical key switches 21, a translation key (SK) 22, a display control key 23, a clear key (CL), and a display 24 of the dot matrix type. The display 24 contains an upper display portion for showing the spelling of the input "source" English word and a lower display portion for showing the spelling of the translated Japanese words together with its part of speech.

FIG. 9 shows a circuit diagram of a control circuit implemented within the language interpreter of FIG. 8. The control circuit comprises a input keyboard K equivalent to the 26 alphabetical key switches 21 of FIG. 8, a key SK equivalent to the translation key 22 of FIG. 8, a display control key 23 equivalent to the same of FIG. 8, an encoder EC, a buffer circuit WR, an equivalence detection circuit CP, a register SR, a memory MU, an address decoder AD, an address register AR, a code circuit J, a gate circuit G, a register R, a display control circuit DSC, a display DSP equivalent to 24 of FIG. 8, an address counter AC, and a digit circuit JL.

The encoder EC is provided for encoding input signals entered by the input keyboard K. The buffer circuit WR is provided for temporarily storing output signals from the encoder EC. The memory MU contains a plurality of "source" English words, translated Japanese words, and parts of speech in coded forms.

The register SR functions to temporarily contain spelling code information indicative of the "source" English words developed from the memory MU. The equivalence detection circuit CP is provided for determining the equivalency between spelling code information from the buffer circuit WR representing one of the input "source" words entered and output signals from the register SR corresponding to the spelling code information generated by the memory MU.

The address register AR and the address counter AC are used to activate the memory MU. The address decoder AD is operated to address a plurality of memory cells of the memory MU. The code circuit J functions to detect and determine the kind of codes in which the "source" English words, the translated Japanese words, and the parts of speech, all developed from the memory MU, are identified and separated. The gate circuit G is provided for switching the output signals from the memory MU. The register R stores another type of spelling code information indicative of the translated Japanese words generated by the memory MU. The display control circuit DSC is employed to control operation of the display DSP. The digit circuit J acts to determine the number of characters contained within the register R.

Figure 13:
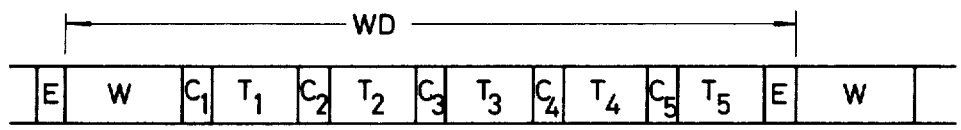
FIGS. 13 and 14 show each parts of the contents of a memory contained within the control circuit of FIG. 9.

FIG. 13 shows parts of the contents within the memory MY in symbolical letters. In FIG. 13, W denotes a code representing one of the "source" English words, each of $T_1$ through $T_5$ indicates a code representing one of the translated Japanese words, and each of $C_1$ through $C_5$ represents a code indicative of one of parts of speech related to one of $T_1$ through $T_5$. E denotes an end code indicating the end of one or more translated Japanese words. WD designates the length of data including a certain "source" English word, one or more translated Japanese words, and one or more parts of speech. Needless to say, the number of the translated Japanese words and the parts of speech will vary.

Figure 14:
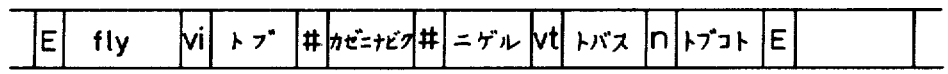

FIG. 14 shows a preferable example of parts of contents within the memory MU in association with FIG. 13. The example of FIG. 14 is a particular "source" English word "fly", usual abbreviations used in any dictionary indicative of the parts of speech, and five translated Japanese words. A character "#" denotes that the part of speech is the same as the previous part of speech "vi".

Under the circumstances, a particular "source" English word, e.g., "fly" is assumed to be entered into the control circuit as shown in FIG. 9. The control circuit is responsive to the introduction of the word "fly" for enabling output of the translated words together with the parts of speech as shown in FIG. 15.

Responsive to the activation of the key SK, the input "source" English word "fly" and one or more translated words belonging to the first part of speech are displayed after a certain memory cell of the memory MU containing them as shown in FIG. 14 is detected. This situation is shown in FIG. 15(a). In the case where the translated words require a number of display digits more than the capacity of the lower display portion of the display DSP, e.g. 16 digits, the left shifting display operation is carried out as shown in FIGS. 15(a) through 15(c) either as a continuous flow or by shifting digit by digit.

The key SK is again operated to obtain the translated Japanese word together with a following part of speech "vt". In this case, the translated Japanese word does not require the number of the display digits in excess of the capacity of the display DSP, namely 16 digits. Accordingly, the running shifting display operation is not necessary to be performed. A stationary display of FIG. 15(d) is obtained.

The key SK is further operated to obtain the translated Japanese word together with the following part of speech "n" as shown in FIG. 15(e). At this point all the translated Japanese words which are stored in the memory MU in connection with the "source" English word have been once displayed.

If the key SK is again operated, the display as shown in FIG. 15(f) which is equivalent to that of FIG. 15(a) is obtained. It can be summarized that each time the key SK is activated, one or more translated Japanese words are displayed together with the part of speech pertinent to them.

FIG. 10 shows a more detailed circuit diagram of the display control circuit DSC. With reference to FIG. 10, the contents of the register R are transported to a display register RR under the control by an input circuit IC. A shift circuit SC shifts the contents of the display register RR. The shift circuit SC responds to the condition of a flip flop $F_3$ and stops or enables the shift of the contents of the display register RR leading to the shift of the display. A first driver $DR_1$ is a circuit for causing the contents of the display register RR to be displayed in the lower display portion of the display DSP. A second driver $DR_2$ is a circuit for causing the contents of the buffer circuit WR to be displayed in the upper display portion of the display DSP.

Figure 11:
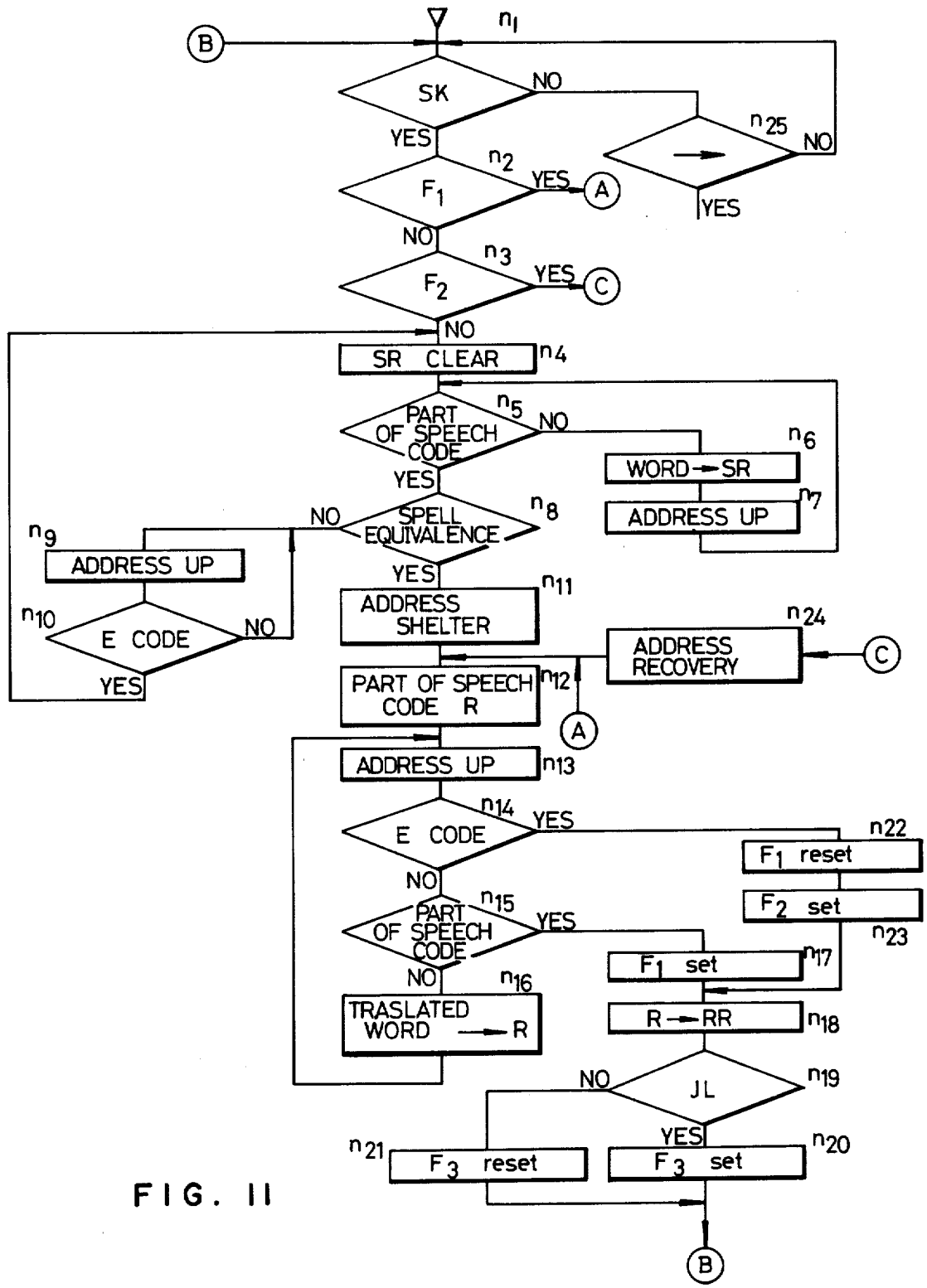
FIGS. 11 and 12 show each flow charts illustrating operation of the control circuit of FIG. 9.
Figure 12:
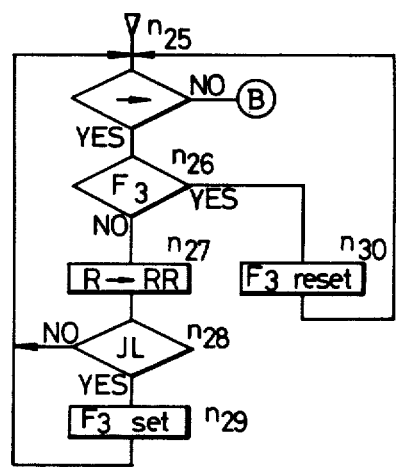

Operation of the control circuit of FIG. 9 will be illustrated referring to flow charts of FIGS. 11 and 12.

In the case where the particular "source" word "fly" is introduced by means of the input keyboard K, the spelling coded information corresponding to the word "fly" is applied to the buffer circuit WR. As soon as the key SK is operated to start translation, the equivalence detection circuit CP selects a leading address after which a certain number of words starting with with "fl" are to be stored.

According to the selected leading address, the address counter AC, the address register AR, and the address decoder AD address a certain address of the memory MU. Therefore, the memory MU delivers a chain comprising the "source" English word, the one or more translated Japanese words, and the parts of speech. Responsive to the code information W as described with FIG. 13, the code circuit J permits the gate circuit G to pass the code information W to the register SR.

Therefore, the circuit CP compares the contents of the register SR and those of the buffer circuit WR. The equivalence detection circuit CP generates signals $S_1$ in the case where the contents of the register SR and the buffer circuit WR are not equivalent. The signals $S_1$ increment the address set in the address counter AC. The memory MU is further addressed according to the new address by means of the address counter AC, the address register AR, and the address decoder AD.

When the equivalence detection circuit CP detects that the contents of the register SR and the buffer circuit WR are equivalent, it generates its output signals $S_2$ applied to the display control circuit DSC. As a result, the one or more translated Japanese words and the one or more parts of speech are entered to the display control circuit DSC through the gate circuit G and the register R. They are displayed in the display DSP together with the "source" English word under the control of the circuit DSC.

In the flow chart of FIG. 11, step $n_2$ is selected from step $n_1$ by the actuation of the key SK. Steps $n_2$ and $n_3$ are executed to detect conditions of flip flops $F_1$ and $F_2$, respectively. The flip flop $F_1$ is used to represent whether a word stored in the memory MU equivalent to the input 37 source" English word has been found or not. The flip flop $F_2$ is used to enable the detection of the end code E.

The two flip flops $F_1$ and $F_2$ are reset and step $n_4$ is selected. Step $n_4$ is used to clear the contents of the register SR. Step $n_5$ is executed to detect whether the code information generated by the memory MU indicates any part of speech, with the help of the code circuit J. When it is not for any part of speech, but for the "source" English word, the spelling code information indicative of the "source" English word is transferred to the register SR in step $n_6$. Step $n_7$ is performed to increment the number of an address for the memory MU by one.

The part of speech code is related to the code $C_1$ as explaiend with FIG. 13. Steps $n_5 \rightarrow n_6 \rightarrow n_7 \rightarrow n_5$ are repeated as long as the part of speech code is not generated. Step $n_8$ is executed to determine whether there is present or not a "source" English word equivalent to the input "source" English word "fly". If not, the program is advanced into step $n_9$ in which the number of an address for the memory MU is incremented. Steps $n_9$ and $n_{10}$ are repeated until the end code E is generated and detected.

The detection of the end code E advances the program to steps $n_4 \rightarrow n_5 \rightarrow n_8$, whereby a word following the end code E is transferred to the register SR. Step $n_8$ is executed to determine whether there is present or not a "source" English word equivalent to the input "source" English word "fly". When the equivalence is detected, the address at which the equivalent "source" English word has been generated is stored in an address shelter in step $n_{11}$. Step $n_{12}$ is used to enable the transference of a part of speech code into the register R, the part of speech code being with respect to a "source" English word following the presently retrieved "source" English word. Steps $n_{13}$, $n_{14}$, $n_{15}$ and $n_{16}$ are repeated until the following part of speech code or the end code E is generated and detected. Information with respect to one or more parts of speech code and one or more translated Japanese words is stored in the register R.

The character "#" is considered not to be a code indicative of any part of speech. The introduction of the character "#" into the register R leads to the display of a comma "," in the display DSP with the help of the display control circuit DSC. When the part of speech code "Vt" is detected in step $n_{15}$, the register R contains information of

"V 1 ト ブ # カ ゼ ニ ナ ビ グ # ニ グ ル".

Step $n_{17}$ is executed to make the flip flop $F_1$ set, wherein the contents of the register R are transported to the display register RR within the display control circuit DSC. The digit circuit JL determines whether the contents of the register R require 16 digits or more for the display. In the case where digits required are in excess of 16 digits, the program proceeds to step $n_{20}$ wherein the flip flop $F_3$ is turned set.

After step $n_{20}$, the display routine is enabled to show the displays of FIG. 15. In such a case, the actuation of the key SK advances the program from step $n_2$ to step $n_{12}$, wherein the part of speech code detected in step $n_{15}$ is transported to the register R. One or more translated Japanese words are transported to the register R until next part of speech code is developed and detected, as described previously.

Thus, each time the key SK is actuated, one or more translated Japanese words are retrieved and displayed together with a part of speech. The one or more translated Japanese words are all identified by the part of speech. Where the key SK is actuated when a certain translated Japanese word is displayed, a part of speech code and its translated Japanese word just following the displayed Japanese word are transferred to the register R. When the end code E is detected in step $n_{14}$, step $n_{22}$ is executed to make the flip flop $F_1$ reset and step $n_{23}$ is executed to make the flip flop $F_2$ set.

Under the circumstances, the key SK is actuated to select steps $n_3 \rightarrow n_{24}$. In step $n_{24}$, the sheltered address is recovered. That is, the three translated Japanese words with respect to the part of speech "vi" are again transferred from the memory MU to the register R. The display of FIG. 15(a) is obtained again. Each time the key SK is operated, one or more translated Japanese words are displayed and grouped with one of the parts of speech. No additional key is required to retrieve and display one or more translated words which belong to each of parts of speech.

As seen from the flow chart of FIG. 12, the display control key 23 is operated to select steps $n_{25}$ and $n_{26}$. The flip flop $F_3$ is placed in set condition while the shifting display is performed. Step $n_{30}$ is executed to make the flip flop $F_3$ reset, wherein the shifting display is prevented. The display control key 23 is further operated to execute step $n_{27}$ wherein the contents of the register R are transported to the display register RR. Under the condition that the contents of the register R require the number of digits in excess of 16 digits, step $n_{29}$ is executed to make the flip flop $F_3$ set. When the contents of the register do not exceed 16 digits, the flip flop $F_3$ is placed in the reset conditions even though the display control key 23 is activated.

That is, the display control key 23 is actuated once for the purpose of stopping the shifting display. It is further actuated to enable display of all the translated Japanese words inclusive of the one or more translated Japanese words at which the shifting display is stopped.

Thus a desired number of repetitions of the display of the one or more translated Japanese words may be obtained with the help of the key SK and the display control key 23.

While only certain embodiments of the present invention have been described, it will be apparent to those skilled in the art that various changes and modifications may be made therein without departing from the spirit and scope of the invention as claimed.

What is claimed is:

1. An electronic dictionary and language interpreter device wherein a first word represented in a first language is entered to obtain a second word or words represented in a second language equivalent to the first word, comprising:

input means for entering the first word;

memory means for storing a plurality of words of the second language inclusive of the second word or words and at least a mark for separating said second words or groups of said second words;

access means responsive to entry of the first word by said input means for addressing said memory means for retrieving the second word or words;

display means comprising means for displaying a predetermined number of characters and responsive to said access means for displaying the second word or words;

means associated with said display means for shifting the second word or words displayed thereon when the data length of the second word or words exceeds said predetermined number of characters;

means for detecting that said mark is displayed in a selected portion within the display means; and means responsive to said detecting means for replacing all characters indicated on said display with a new display of up to said predetermined number of characters.

2. The device according to claim 1, further comprising timer means associated with said shifting means and said replacing means for determining the length of time during which the display means exhibits particular data prior to shifting or replacing the data.

3. The device according to claim 1, wherein said replacing means comprises display switching means responsive to detection of the mark for switching the display of one of the second words to a display of another of the second words.

4. The device according to claim 1, wherein said selected portion within the display means is the position for displaying the last character thereon.

5. An electronic dictionary and language interpreter device wherein a first word represented in a first language is entered to obtain second words represented in a second language equivalent to the first word, comprising:

input means for entering the first word;

memory words for storing the second words and indicators of parts of speech with respect to at least one of the second words;

access means responsive to entry of the first word by said input means for addressing the memory means and for retrieving the second words and indicators of parts of speech;

detection means responsive to predetermined data in said memory means which separates the second words according to their respective different parts of speech; and display means responsive to detection of the predetermined data for displaying the second words in groups according to their parts of speech.

6. The device according to claim 5, wherein said display means comprises means for displaying data comprising a predetermined number of characters and means associated with said display means for shifting the displayed data when the data length of the second words and of the indicator of parts of speech exceeds the capacity of the display means, wherein the second words and the indicator of parts of speech are displayed on the display means for a given length of time prior to shifting.

7. The device according to claim 6, further comprising stopping means connected to the display means for stopping the shifting operation of the display means.

8. The device according to claim 6, further comprising repeating means connected to the display means for repeating the shifting operation by the display means, whereby at least one of the second words can be displayed more than once.

* * * * *